US008655953B2

(12) United States Patent
Kandekar et al.

(10) Patent No.: US 8,655,953 B2
(45) Date of Patent: Feb. 18, 2014

(54) SYSTEM AND METHOD FOR PLAYBACK POSITIONING OF DISTRIBUTED MEDIA CO-VIEWERS

(75) Inventors: Kunal Kandekar, Raleigh, NC (US); Alfredo C. Issa, Apex, NC (US); Richard J. Walsh, Raleigh, NC (US)

(73) Assignee: Porto Technology, LLC, Wilmington, DE (US)

( * ) Notice: Subject to any disclaimer, the term of this patent is extended or adjusted under 35 U.S.C. 154(b) by 923 days.

(21) Appl. No.: 12/175,752

(22) Filed: Jul. 18, 2008

(65) Prior Publication Data
US 2010/0017474 A1 Jan. 21, 2010

(51) Int. Cl.
*G06F 15/16* (2006.01)

(52) U.S. Cl.
USPC ............ 709/205; 709/200; 715/753; 715/787

(58) Field of Classification Search
USPC .............. 384/84, 88, 108, 124; 709/205, 216, 709/219, 224, 225, 200, 220; 715/733, 741, 715/753, 758, 754, 759, 787; 725/146, 20, 725/153
See application file for complete search history.

(56) References Cited

U.S. PATENT DOCUMENTS

| | | | |
|---|---|---|---|
| 5,229,893 A | 7/1993 | Dworatzek et al. | |
| 5,598,352 A | 1/1997 | Rosenau et al. | |
| 5,717,869 A | 2/1998 | Moran et al. | |
| 5,786,814 A * | 7/1998 | Moran et al. | 715/720 |
| 5,815,634 A | 9/1998 | Daum et al. | |
| 5,956,027 A | 9/1999 | Krishnamurthy | |
| 6,177,928 B1 | 1/2001 | Basso et al. | |
| 6,448,978 B1 | 9/2002 | Salvador et al. | |
| 6,505,348 B1 | 1/2003 | Knowles et al. | |
| 6,526,411 B1 | 2/2003 | Ward | |
| 6,748,395 B1 | 6/2004 | Picker et al. | |
| 6,850,256 B2 | 2/2005 | Crow et al. | |
| 6,934,461 B1 | 8/2005 | Strub et al. | |
| 6,959,338 B2 | 10/2005 | Evans | |
| 7,096,416 B1 | 8/2006 | Smith et al. | |
| 7,136,934 B2 | 11/2006 | Carter et al. | |

(Continued)

FOREIGN PATENT DOCUMENTS

| | | |
|---|---|---|
| EP | 1684516 A2 | 7/2006 |
| EP | 2105849 A2 | 9/2009 |

(Continued)

OTHER PUBLICATIONS

Martin Halvey et al., "Exploring Social Dynamics in Online Media Sharing," pp. 1273-1274, WWW 2007, May 8-12, 2007, Banff, Alberta, Canada, http://portal.acm.org/citation.cfm?id=1242804, 2 pages.

(Continued)

*Primary Examiner* — El Hadji Sall (57) ABSTRACT

Systems and methods are disclosed for obtaining and presenting information to a user playing a media item identifying playback positions of a number of other users also playing the media item. In one embodiment, a first user begins playback of a media item. Information identifying playback positions of a number of second users also playing the media item is obtained from a playback information broker and presented to the first user. The first user may then provide user input identifying a desired action to take with respect to one or more of the second users. In response, the desired action is effected.

30 Claims, 7 Drawing Sheets

(56) References Cited

U.S. PATENT DOCUMENTS

| | | |
|---|---|---|
| 7,165,213 B1 | 1/2007 | Busey |
| 7,194,511 B2 | 3/2007 | Stettner |
| 7,274,661 B2 | 9/2007 | Harrell et al. |
| 7,293,280 B1 | 11/2007 | Gupta et al. |
| 7,315,984 B2 | 1/2008 | Crow et al. |
| 7,318,196 B2 | 1/2008 | Crow et al. |
| 7,340,481 B1 | 3/2008 | Baer et al. |
| 7,370,342 B2 | 5/2008 | Ismail et al. |
| 7,426,537 B2 | 9/2008 | Lee et al. |
| 7,434,154 B2 | 10/2008 | Konetski |
| 7,457,511 B2 | 11/2008 | Putterman et al. |
| 7,535,903 B1 | 5/2009 | Patel |
| 7,546,118 B2 | 6/2009 | Camp, Jr. |
| 7,600,243 B2 | 10/2009 | Brain et al. |
| 7,657,614 B2 | 2/2010 | Gyorfi et al. |
| 7,668,914 B2 | 2/2010 | Parker et al. |
| 7,669,219 B2 | 2/2010 | Scott, III |
| 7,693,535 B2 | 4/2010 | Dunko |
| 7,694,225 B1 | 4/2010 | Weber et al. |
| 7,716,376 B1 | 5/2010 | Price et al. |
| 7,735,101 B2 | 6/2010 | Lanza et al. |
| 7,739,584 B2 | 6/2010 | Vella et al. |
| 7,783,703 B2 | 8/2010 | Rafey et al. |
| 7,790,975 B2 | 9/2010 | Eastwood et al. |
| 7,805,373 B1 | 9/2010 | Issa et al. |
| 7,818,770 B2 | 10/2010 | Ducheneaut et al. |
| 7,818,771 B2 | 10/2010 | Ducheneaut et al. |
| 7,870,589 B2 | 1/2011 | Ducheneaut et al. |
| 7,873,983 B2 | 1/2011 | Ducheneaut et al. |
| 2001/0003099 A1 | 6/2001 | Von Kohorn |
| 2002/0067909 A1* | 6/2002 | Iivonen .......................... 386/88 |
| 2002/0144259 A1 | 10/2002 | Gutta et al. |
| 2002/0174426 A1 | 11/2002 | Gutta et al. |
| 2003/0009459 A1 | 1/2003 | Chastain et al. |
| 2003/0068155 A1 | 4/2003 | Vasilevsky et al. |
| 2003/0101450 A1* | 5/2003 | Davidsson et al. ............. 725/32 |
| 2003/0147624 A1 | 8/2003 | Trajkovic et al. |
| 2003/0188320 A1 | 10/2003 | Shing |
| 2004/0205107 A1* | 10/2004 | Yoon ............................ 709/200 |
| 2004/0221309 A1 | 11/2004 | Zaner et al. |
| 2004/0225640 A1 | 11/2004 | Brown et al. |
| 2005/0015805 A1 | 1/2005 | Iwamura |
| 2005/0036557 A1 | 2/2005 | Balakrishnan et al. |
| 2005/0204398 A1 | 9/2005 | Ryal |
| 2005/0262141 A1 | 11/2005 | Miyamori |
| 2005/0286546 A1 | 12/2005 | Bassoli et al. |
| 2005/0289265 A1 | 12/2005 | Illowsky et al. |
| 2006/0002681 A1 | 1/2006 | Spilo et al. |
| 2006/0020973 A1 | 1/2006 | Hannum et al. |
| 2006/0080716 A1 | 4/2006 | Nishikawa et al. |
| 2006/0087941 A1 | 4/2006 | Obradovich |
| 2006/0112343 A1 | 5/2006 | Ducheneaut et al. |
| 2006/0112344 A1* | 5/2006 | Ducheneaut et al. ......... 715/758 |
| 2006/0143236 A1 | 6/2006 | Wu |
| 2006/0161621 A1 | 7/2006 | Rosenberg |
| 2006/0165379 A1 | 7/2006 | Agnihotri et al. |
| 2006/0174277 A1 | 8/2006 | Sezan et al. |
| 2006/0174311 A1 | 8/2006 | Ducheneaut et al. |
| 2006/0247976 A1 | 11/2006 | Posokhow et al. |
| 2006/0282797 A1 | 12/2006 | Barsness et al. |
| 2006/0282851 A1 | 12/2006 | Errico et al. |
| 2006/0282856 A1 | 12/2006 | Errico et al. |
| 2007/0011237 A1 | 1/2007 | Mockett |
| 2007/0055926 A1 | 3/2007 | Christiansen et al. |
| 2007/0074115 A1 | 3/2007 | Patten et al. |
| 2007/0101369 A1 | 5/2007 | Dolph |
| 2007/0110398 A1 | 5/2007 | Broeksteeg |
| 2007/0154171 A1 | 7/2007 | Elcock et al. |
| 2007/0162569 A1 | 7/2007 | Robinson et al. |
| 2007/0198111 A1 | 8/2007 | Oetzel et al. |
| 2007/0214471 A1 | 9/2007 | Rosenberg |
| 2007/0226315 A1 | 9/2007 | Espelien |
| 2007/0245243 A1 | 10/2007 | Lanza et al. |
| 2007/0274187 A1 | 11/2007 | Schipper et al. |
| 2007/0280638 A1 | 12/2007 | Aoki et al. |
| 2007/0283380 A1 | 12/2007 | Aoki et al. |
| 2008/0031590 A1 | 2/2008 | Kulas |
| 2008/0031595 A1* | 2/2008 | Cho ............................... 386/108 |
| 2008/0032723 A1 | 2/2008 | Rosenberg |
| 2008/0037953 A1 | 2/2008 | Kawamura et al. |
| 2008/0040759 A1 | 2/2008 | She et al. |
| 2008/0056675 A1 | 3/2008 | Wright et al. |
| 2008/0080448 A1 | 4/2008 | Rottinghaus |
| 2008/0088735 A1 | 4/2008 | Biniak et al. |
| 2008/0120501 A1 | 5/2008 | Jannink et al. |
| 2008/0133763 A1 | 6/2008 | Clark et al. |
| 2008/0152309 A1 | 6/2008 | Shih et al. |
| 2008/0162668 A1 | 7/2008 | Miller |
| 2008/0216117 A1 | 9/2008 | Lee et al. |
| 2008/0263014 A1 | 10/2008 | Garijo Mazario et al. |
| 2008/0281783 A1* | 11/2008 | Papkoff et al. ..................... 707/3 |
| 2008/0317439 A1 | 12/2008 | Wong et al. |
| 2009/0016696 A1* | 1/2009 | Hsieh et al. ................... 386/124 |
| 2009/0044216 A1 | 2/2009 | McNicoll |
| 2009/0060467 A1* | 3/2009 | Grigsby et al. ............... 386/124 |
| 2009/0102983 A1 | 4/2009 | Malone et al. |
| 2009/0164516 A1* | 6/2009 | Svendsen et al. .......... 707/104.1 |
| 2009/0183220 A1* | 7/2009 | Amento et al. ............... 725/120 |
| 2009/0222520 A1 | 9/2009 | Sloo et al. |
| 2009/0232481 A1 | 9/2009 | Baalbergen et al. |
| 2009/0249222 A1 | 10/2009 | Schmidt et al. |
| 2009/0249223 A1* | 10/2009 | Barsook et al. ............... 715/753 |
| 2009/0276821 A1 | 11/2009 | Amento et al. |
| 2009/0282102 A1 | 11/2009 | Geurts et al. |
| 2009/0317060 A1* | 12/2009 | Han et al. ......................... 386/95 |
| 2010/0082727 A1 | 4/2010 | Zalewski |
| 2010/0111491 A1 | 5/2010 | Kamoto |
| 2010/0125876 A1 | 5/2010 | Craner et al. |
| 2010/0186034 A1 | 7/2010 | Walker |

FOREIGN PATENT DOCUMENTS

| | | |
|---|---|---|
| JP | 2008258685 A | 10/2008 |
| WO | 95/34169 A1 | 12/1995 |
| WO | 2004/017178 A2 | 2/2004 |
| WO | 2005/013617 A1 | 2/2005 |
| WO | 2006/082566 A1 | 8/2006 |
| WO | 2008/102331 A2 | 8/2008 |

OTHER PUBLICATIONS

"Yahoo's new Live Video API," http://blog.programmableweb.com/category/video/, Feb. 8, 2008, printed Apr. 2, 2008, 13 pages.

"Welcome to Facebook!—Facebook," http://www.facebook.com/, copyright 2008 Facebook, printed Jan. 9, 2009, 1 page.

"LinkedIn: Relationships Matter," http://www.linkedin.com/, copyright 2009 LinkedIn Corporation, printed Jan. 22, 2009, 1 page.

"MySpace," http://www.myspace.com, copyright 2003-2008 MySpace.com, printed Jan. 22, 2009, 1 page.

"YouTube—Broadcast Yourself," http://www.youtube.com/, copyright 2009 YouTube, LLC, printed Aug. 13, 2009, 2 pages.

"Apple—iTunes—What is iTunes?—A player, a store, and more.," http://www.apple.com/itunes/whatis, printed Aug. 11, 2009, 2 pages.

"Affordable Web Meetings | Dimdim," found at <http://www.dimdim.com/products/what_is_dimdim.html> on Internet Archive, dated May 28, 2010, printed Oct. 25, 2011, 4 pages.

"betterPropaganda—Free MP3s and music videos.," at <http://www.betterpropaganda.com/>, copyright 2004-2005, betterPropaganda, printed Feb. 7, 2007, 4 pages.

Blakowski, G. and Steinmetz, R., "A Media Synchronization Survey: Reference Model, Specification, and Case Studies," IEEE Journal on Selected Areas in Communications, vol. 14, No. 1, Jan. 1996, found at <http://www.cs.uiuc.edu/class/sp08/cs414/SyncPaper.pdf>, 31 pages.

Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

Jameson, A. et al., "Enhancing Mutual Awareness in Group Recommender Systems," in B. Mobasher & S.S. Anand (Eds.), Proceedings (56) References Cited

OTHER PUBLICATIONS of the Int. Joint Conference on Artificial Intelligence 2003 Workshop on Intelligent Techniques for Web Personalization, Aug. 9-15, 2003, Acapulco, Mexico, 8 pages.

"Last.fm—The Social Music Revolution," at <http://www.last.fm/>, printed Feb. 7, 2007, 1 page.

Liu, Y. et al., "Zync: the design of synchronized video sharing," Proceedings of DUX '07 (2007 Conference on Designing for User eXperiences), Nov. 5-7, 2007, Chicago, Illinois, 9 pages.

Looms, Thelma Drayton, "Sync-By-CBA: Using Metadata for Content-Based Associations to Facilitate Logically Synchronized and Adaptive Multimedia Presentations," dissertation submitted to the Faculty of the School of Engineering and Applied Science of the George Washington University, May 19, 2002, Professor C. Dianne Martin, found at <http://users.rcn.com/tlooms/TLooms_Dissertation_Excerpts.pdf>, 26 pages.

Manvi, S.S. and Venkataram, P., "An agent based synchronization scheme for mulitmedia applications," The Journal of Systems and Software, 79, 2006, pp. 701-713, accepted Aug. 12, 2005, available online Sep. 28, 2005, found at <http://www.semgrid.net/Citation-Before-2006.1/%2B%2BJSS-2006-Agent.pdf>, 13 pages.

McKinney, D. et al., "iTunes University and the classroom: Can podcasts replace Professors?", Computers & Education, vol. 52, Issue 3, Apr. 2009, pp. 617-623, Copyright 2008, Elsevier Ltd., article accepted Nov. 4, 2008, found at <http://www.fredonia.edu/department/psychology/pdf/CAE1263.pdf>, 7 pages.

"North American Consumer DVR and Space-shifting Devices Markets," at <frost.com/prod/.../report-brochure.pag?. . . >, Aug. 31, 2005, Frost & Sullivan Research Service, printed Feb. 24, 2010, 6 pages.

Oehlberg, L. et al., "Social TV: Designing for Distributed, Sociable Television Viewing," Proceedings of the 4th EuroITV Conference, May 25-26, 2006, Athens, Greece, pp. 251-259, 10 pages.

Smith, M.A. and Kanade, T., "Video Skimming for Quick Browsing based on Audio and Image Characterization," Jul. 30, 1995, tech. report CMU-CS-95-186, School of Computer Science, Carnegie Mellon University, Pittsburgh, Pennsylvania, found at <http://citeseer.ist.psu.edu/viewdoc/download;jsessionid=2141C7572FEBCF37FD9E7DFA1103758B?doi=10.1.1.33.1714&rep=rep1&type=pdf>, 24 pages.

"Start Listening with Last.fm," at <http://www.last.fm/>, date unknown, 1 page.

Sussman, R. and Laroche, J., "Application of the Phase Vocoder to Pitch-Preserving Synchronization of an Audio Stream to an External Clock," Proceedings of 1999 IEEE Workshop on Applications of Signal Processing to Audio and Acoustics, New Paltz, New York, Oct. 17-20, 1999, found at <http://citeseerx.ist.psu.edu/viewdoc/download?doi=10.1.1.59.9808&rep=rep1&type=pdf>, 4 pages.

Waldegg, Daniela B., "A Temporal Synchronization-based Scheduling Policy for Adaptive Multimedia Presentation Applications," Telecom Bretagne, Networks and Multimedia Services Department, Cesson-Sevigne, France, Dec. 1996, found at <http://cimic.rutgers.edu/~ahgomaa/ua/research/temp_sync.pdf>, 4 pages.

Weisz, J. D. et al., "Watching Together: Intergrating Text Chat with Video," CHI 2007 Proceedings, Video, Apr. 28-May 3, 2007, San Jose, California, found at <http://esm.cs.cmu.edu/technology/papers/Chi.WatchingTogether.2007.pdf>, 10 pages.

Weisz, J.D., "Social Online Video Experiences," Thesis Proposal, Mar. 2008, School of Computer Science, Carnegie Mellon University, Pittsburgh, Pennsylvania, 79 pages.

\* cited by examiner

SYSTEM AND METHOD FOR PLAYBACK POSITIONING OF DISTRIBUTED MEDIA CO-VIEWERS

FIELD OF THE INVENTION

The present invention relates to obtaining and presenting playback information to a user for a number of distributed users playing a media item.

BACKGROUND OF THE INVENTION

Social networking is an important aspect of today's digital world. Social networking websites, such as the MySpace® and Facebook® social networking websites, are experiencing great success. Another area that is experiencing great success is the distribution and sharing of media content such as videos. As such, there is a desire to leverage the success of such media distribution and sharing services to provide an enhanced social networking experience.

SUMMARY OF THE INVENTION

The present invention relates to obtaining and presenting information to a user playing a media item identifying playback positions of a number of other users also playing the media item. In one embodiment, a first user begins playback of a media item. Information identifying playback positions of a number of second users also playing the media item is obtained from a playback information broker and presented to the first user. The first user may then provide user input identifying a desired action to take with respect to one or more of the second users. For example, the first user may choose to "follow" one of the second users in playback of the media item such that playback of the media item is substantially synchronized at a device of the first user and a device of the second user, "follow" one of the second users in playback of the media item or any other media item played by the second user such that media item playback is substantially synchronized at the device of the first user and the device of the second user, request that one or more of the second users "follow" him in playback of the media item, request that one or more of the second users "follow" him in playback of the media item and any subsequently played media items, or the like. As another example, the first user may choose to initiate a chat session with one or more of the second users.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
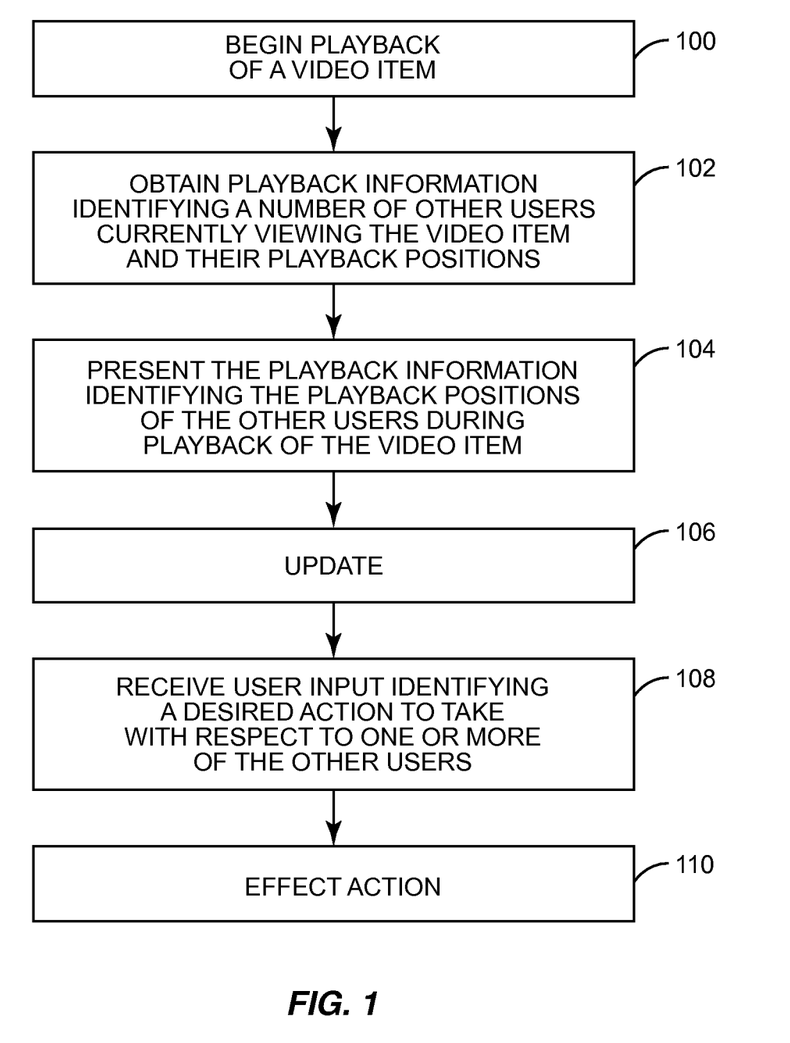
FIG. 1 is a flow chart illustrating a process for obtaining and presenting information to a user playing a media item identifying playback positions of a number of other users also playing the media item according to one embodiment of the present invention.

FIG. 1 is a flow chart illustrating a process for obtaining and presenting information to a user playing a media item identifying playback positions of a number of other users also playing the media item according to one embodiment of the present invention. Note that while much of the discussion herein focuses on playback of video items, the present invention is equally applicable to other types of media items such as, for example, audio items (e.g., songs, audio books, radio broadcasts, podcasts, or the like). First, a user begins playback of a video item (step 100). As discussed below, the video item may be a video item stored locally at a device of the user providing playback of the video item, downloaded from a source such as a content server, streamed from a source such as a content server, or the like.

In this example, after playback of the video item has begun, the device of the user obtains playback information identifying a playback position of each of a number of other users also playing the video item (step 102). Alternatively, the playback information may be obtained after the video item is selected for playback but before playback has begun. As discussed above, the playback information is obtained from a playback information broker that maintains the playback information. The other users for which the playback information is obtained may be all users that are know to the system and playing the video item. Alternative, filtering may be applied by the playback information broker in order to reduce the number of other users for which playback information is provided to the device of the user.

More specifically, in order to perform filtering, a list of other users currently playing video item may first be obtained. The list of other users may then be filtered based on one or more criteria such as, for example, geographic location, geographic distance from the user, demographic information (e.g., age, sex, or the like), a social network of the user, similarity of the user profiles and/or preferences of the other user with that of the user, or the like. For example, the list of other users currently playing the video item may be filtered based on geographic location to remove those other users that are not located within the same geographic location as the user. The geographic location may be any geographic region such as, but not limited to, a country, a region of a country, a state, a city, a town, an area defined by a telephone area code, an area defined by a zip code, an area defined by geographic designations such as latitude and longitude, or the like. As another example, the list of other users may be filtered to remove those other users that are not within a defined geographic, or physical, distance from the user. As another example, the list of other users may be filtered based on demographic information to remove those other users that do not have demographics matching those of the user, demographics identified by the user as preferred demographics, demographics within a defined range of the demographics of the user, or the like. As a final example, the list of other users may be filtered to remove those other users that are not within a social network of the user, within a defined logical distance from the user in a social network of the user, on a contact list such as an email contact list or buddy list of the user, or the like.

At this point, the playback information identifying the playback positions of the other users is presented to the user during playback of the media item (step 104). Again, the other users for which the playback information is presented may be all other users currently viewing the video item. Alternatively, filtering may be performed at the user device based on one or more of the criteria discussed above such that playback information for only a subset of all of the users currently viewing the video item is presented to the user.

The playback information identifying the playback positions of the other users may be presented, for example, on a scrubber bar, as a list of names or other identifiers of the other users viewing the video item and their playback positions, or the like. Note, however, that the particular manner in which the playback information is presented may vary depending on the particular embodiment. For example, if the device is a personal computer, the playback information may be presented in a scrubber bar provided by a media player application, a scrubber bar provided by a plug-in to the media player application, a separate window provided by a plug-in to the media player application, or the like. As another example, if playback of the video item is provided via a web browser, the playback information may be presented via the same window or a separate window provided by the web browser. As final example, if the device is a set-top box, the playback information may be presented as an overlay that graphically indicates the playback positions of the other users, provides a list of the other users and their playback positions, or the like.

Note that additional information regarding the other users may also be presented. For example, in addition to the playback information, for each of the other users, a status of the other user, contextual information regarding the other user, personal information (e.g., name, telephone number, email address, geographic location, etc.), or the like may be presented or available for presentation upon request. The status of a user may be, for example, information indicating that the user is or is not available for a chat session, information identifying a device on which the other user is viewing the video item, or the like. The contextual information may include, for example, information defining and/or identifying a number of users that are currently following the other user in playback, information identifying another user that the other user is following, information regarding what portion of the video item the other user is watching, or the like. The information regarding the portion of the video item that the other user is watching may be, for example, a screen shot, a video clip, or the like. Also, if the users for which the playback information is presented were selected from all other users viewing the video item via a filtering process, then the contextual information may also include information regarding why the other user was selected. For example, if filtering is performed based on geographic location, the contextual information may include the geographic location of the other user, distance between the other user and the user to which the contextual information is presented, or the like. Also note that the user to which the playback information is presented may choose to no longer display the playback information if desired. Similarly, the other users may be enabled to choose to stop sharing their playback information at any time.

In one embodiment, the user may be enabled to configure how the playback information is presented. More specifically, the user may, for example, define a maximum number of other users for which to present playback information, define one or more criteria for selecting the other users for which to present playback information from a larger number of other users viewing the video item, choose to have the information identifying the other users presented but not their playback locations, or the like. In addition or alternatively, the other users may be enabled to configure privacy settings that define the types of information to be shared with the specific user viewing the video item or any other user viewing the video item. For example, a user may define his privacy settings such that his shared playback information includes information identifying the video item that he is viewing but not his specific playback position. The privacy settings may additionally or alternatively define the types of additional information to be shared with the specific user viewing the video item or any other user viewing the video item. For example, the user may define his privacy settings such that the contextual information for the user is not shared with other users viewing the video item.

Thereafter, the playback information identifying the playback positions of the other users presented to the user is updated (step 106). The playback information is first updated to reflect changes in the playback positions of the other users due to continued playback of the video item by the other users. So, for example, if the playback information initially indicated that user A's playback position is at the twelve-minute and thirty-second (00:12:30) mark, then continued playback by user A is assumed such that the playback position of user A is updated periodically to reflect the updated playback position of user A. Thus, after one-minute, the playback position of user A would be the thirteen-minute and thirty-second (00:13:30) mark. In addition, the playback information is updated to reflect playback control events such as pausing, rewinding, fast-forwarding, or the like by the other users during playback of the video item. Thus, using the example given above, if user A fast-forwards to the fifteen-minute and twenty-second (00:15:20) mark, then the playback information presented to the user is updated to reflect user A's new playback position.

In this example, at some point during playback, user input is received from the user identifying a desired action to take with respect to one or more of the other users currently playing the video item (step 108). For example, the user may be enabled to select one of the other users and choose to "follow" that user during playback of the video item, select one of the other users and choose to "follow" that user during playback of the video item and any subsequently played video items (e.g., "follow" that user during playback of any number of video items in a playback session), select one or more of the other users and choose to have the selected users "follow" him during playback of the video item, select one of the other users and choose to have the selected users "follow" him during playback of the video item and any subsequently played video items (e.g., "follow" him during playback of any number of video items in a playback session), or the like. As another example, the user may be enabled to select one or more of the other users and choose to initiate a chat session or instant messaging session with the selected users, or the like. As a final example, the user may be enabled to enter a comment where the comment is then automatically provided to other users in close proximity to the user in playback of the video item. For instance, the message may automatically be provided to other users within five (5) minutes of the user's playback position.

In response, the desired action is effected (step 110). For example, if the user selects one of the other users and chooses to follow that user during playback of the video item, then playback of the video item to the user is controlled such that it is substantially synchronized to playback by the selected user. Note that playback of the video item to the user may be synchronized to playback by the selected user by controlling playback based on the playback information for the selected user. If the user selects one or more of the other users and chooses to have the selected users follow him during playback of the video item, the user device may send a corresponding request or some central service, such as the playback information broker, may send a corresponding request to user devices of the selected users. The selected users may then be forced for follow the user during playback. Alternatively, the selected users may then be enabled to choose whether to follow the user during playback of the video item. As a final example, if the user chooses to initiate a chat session, a chat session with the one or more selected other users may be initiated with the one or more selected users via an associated chat application.

Figure 2:
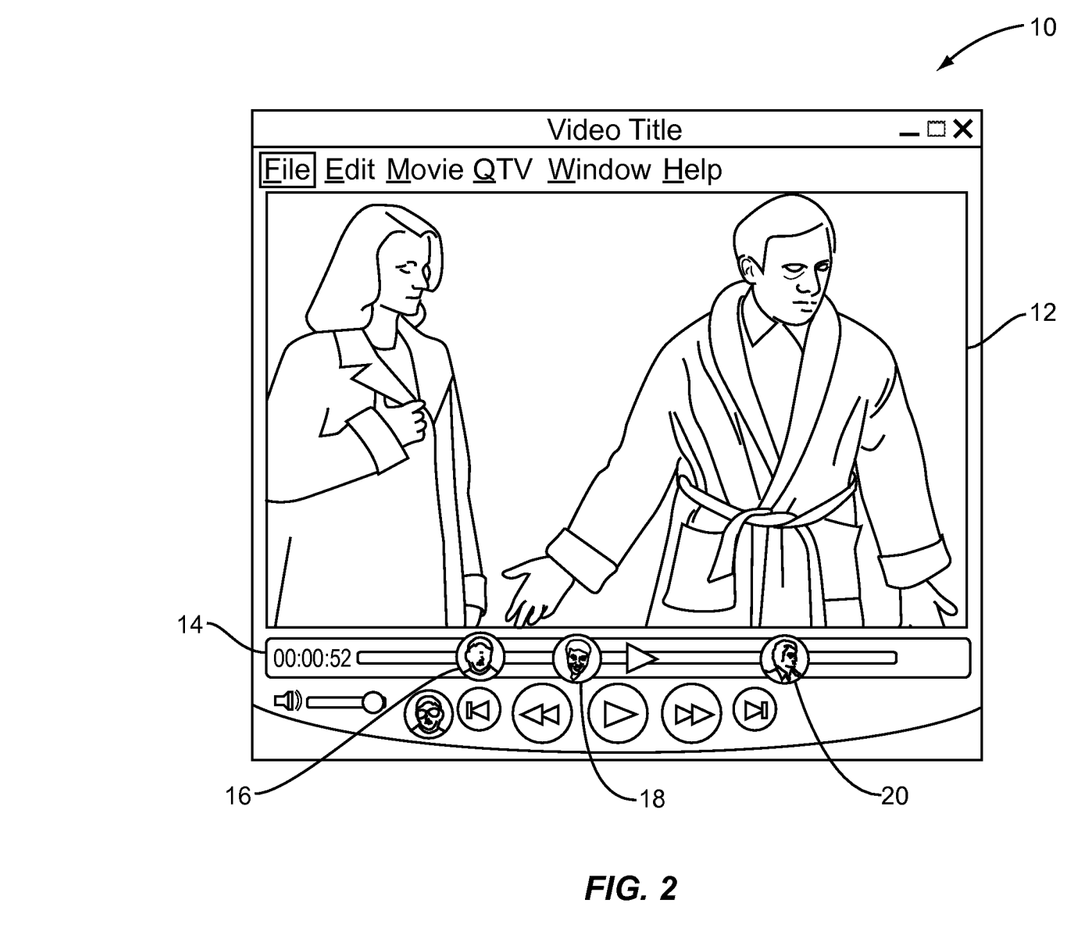
FIG. 2 illustrates a first exemplary Graphical User Interface (GUI) for presenting information to a user playing a media item identifying playback positions of a number of other users also playing the media item according to one embodiment of the present invention.

FIG. 2 illustrates an exemplary graphical user interface (GUI) 10 for presenting, to a user playing a video item, playback information identifying playback positions of other users also playing the video item at that time according to one embodiment of the present invention. While the GUI 10 of this example is one that would typically be provided by a software application running on a personal computer, the present invention is not limited thereto. A similar interface may be provided in a web browser if the user is playing the video item via the web browser. Still further, a similar interface may be provided on other types of devices such as, for example, a portable media player having video playback and network capabilities, a mobile smart phone having video playback capabilities, a set-top box, or the like.

In general, the GUI 10 includes a video playback area 12 and a scrubber bar 14. The scrubber bar 14 operates to indicate a playback position of the associated user. In addition, according to one embodiment of the present invention, the scrubber bar 14 includes user identifiers 16, 18, and 20 indicating playback positions of other users that are also playing the video item. Note that while three user identifiers 16, 18, and 20 are illustrated in this example, there may be any number of one or more user identifiers. In this example, the user identifiers 16, 18, and 20 are pictures of the corresponding users located on the scrubber bar 14 at locations corresponding to the playback positions of the corresponding users. Note that the user identifiers 16, 18, and 20 are not limited to pictures of the corresponding users. Other types of user identifiers may be used. Further, additional information may be presented in association with the user identifiers 16, 18, and 20. For example, upon selecting the user identifier 16 or hovering over the user identifier 16, additional information such as a status of the corresponding user, contextual information regarding the corresponding user such as the number of users following the corresponding user in playback, personal information regarding the corresponding user, or the like may be presented. While not illustrated, the associated user may select one or more of the user identifiers 16, 18, and 20 and initiate a desired action. For example, the associated user may select the user identifier 16 and choose to follow the corresponding user during playback such that playback of the video item for the associated user is substantially synchronized to playback for the user corresponding to the user identifier 16. As another example, the associated user may select the user identifier 16 and initiate a chat session with the corresponding user.

Figure 3:
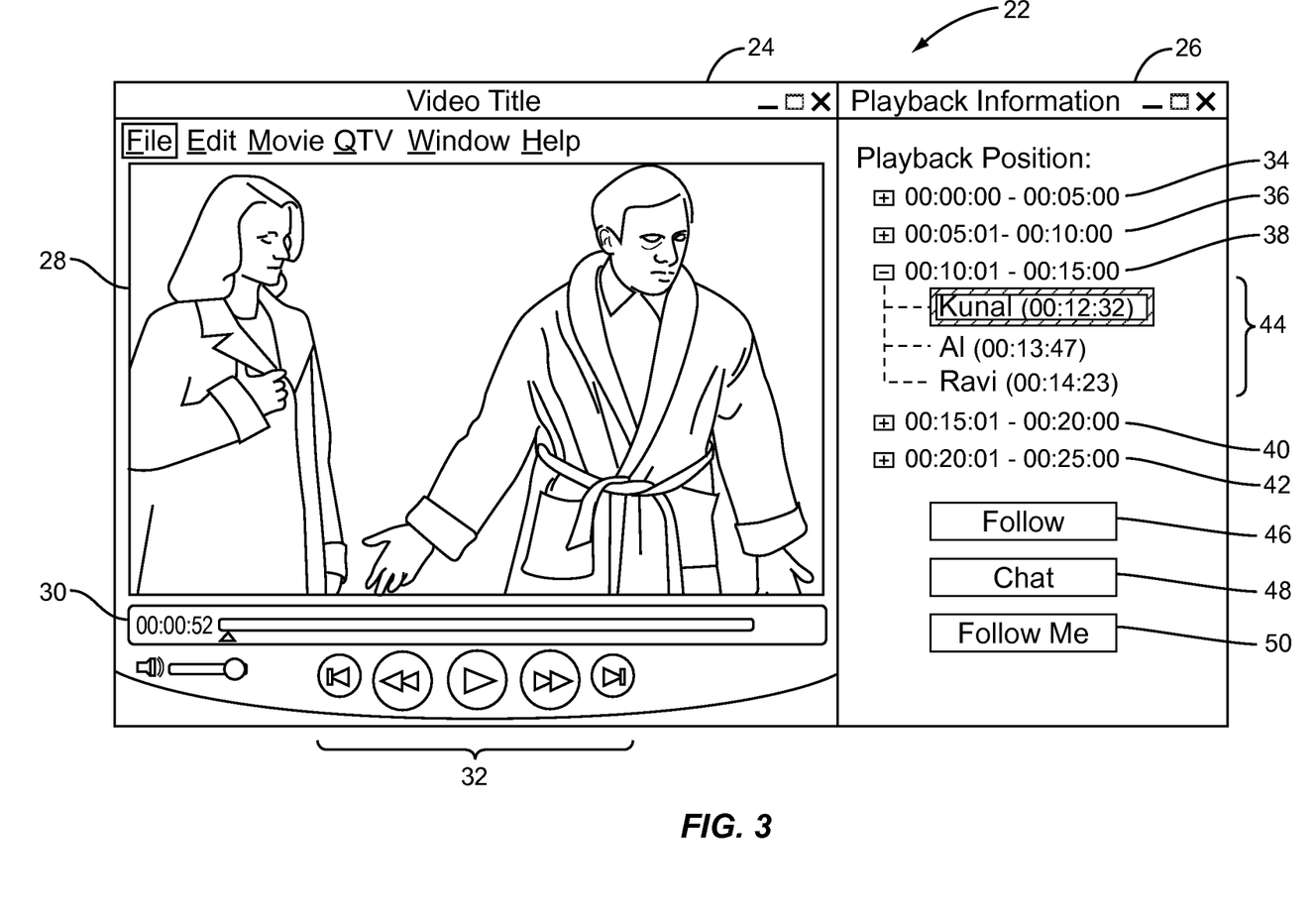
FIG. 3 illustrates a second exemplary GUI for presenting information to a user playing a media item identifying playback positions of a number of other users also playing the media item according to another embodiment of the present invention.

FIG. 3 illustrates another exemplary GUI 22 for presenting, to a user playing a video item, playback information identifying playback positions of other users also playing the video item at that time according to another embodiment of the present invention. The GUI 22 includes a video playback window 24 and a playback information window 26. In one embodiment, the video playback window 24 may be provided by a media player software application such as, for example, the Apple® iTunes® media player, Windows® Media Player, the QuickTime® media player, or the like; and the playback information window 26 may be provided by a plug-in to the media player software application. However, the present invention is not limited thereto. The video playback window 24 and the playback information window 26 may be provided by a single software application. Further, while the GUI 22 of this example is one that would typically be provided by one or more software applications running on a personal computer, the present invention is not limited thereto. A similar interface may be provided by a web browser if the user is playing the video item via the web browser. Still further, a similar interface may be provided on other types of devices such as, for example, a portable media player having video playback and network capabilities, a mobile smart phone having video playback capabilities, a set-top box, or the like.

In general, the video playback window 24 provides a video playback area 28, a scrubber bar 30, and playback controls 32. The playback information window 26 includes, in this example, a list of playback position ranges 34-42. Each of the playback position ranges 34-42 are more generally referred to herein as expandable group indicators representative of a general playback position of a group of one or more users. In this example, the playback position ranges 34-42 are used to collapse multiple users, or playback positions for multiple users, into a single indictor representative of a general playback position for those users. The general playback position may be, as in this example, a playback location range or playback time period. However, the present invention is not limited thereto. The indicator for each of the playback position ranges 34-42 may be expanded to view a listing of each user having a playback position within the corresponding playback position range, the specific playback position of each of the users having a playback position within the corresponding playback position range, or both. In this example, the playback position range 38 has been expanded. As a result, a list 44 is presented including a name or username of each of the users also playing the video item having playback positions within the range of 00:10:01 to 00:15:00 and the specific playback position of each of those users. In this example, the list 44 includes the users Kunal, Al, and Ravi and their corresponding playback position.

In this example, the playback information window 26 also includes a "follow" button 46, a "chat" button 48, and a "follow me" button 50. In this example, the associated user has selected the user Kunal and may then choose to "follow" Kunal in playback of the video item and, optionally, any number of additional video items subsequently played by Kunal by selecting the "follow" button 46, may choose to initiate a chat session with Kunal by selecting the "chat" button 48, or may choose to force Kunal to follow him or request that Kunal follow him during playback of the video item by selecting the "follow me" button 50. Note that, for the "chat" button 48 and the "follow me" button 50, the associated user may select one or more users with which to initiate the action. Also note that there may be separate buttons enabling the user to follow Kunal in playback of the video item and enabling the user to follow Kunal in playback of any video item played by Kunal.

It should be noted that the exemplary GUIs 10 and 22 of FIGS. 2 and 3 are exemplary and not intended to limit the scope of the present invention. In general, information identifying the playback positions of other users may be presented in any desired manner. As another example, referring to FIG. 2, rather than having the user indicators 16, 18, and 20, similar expandable group indicators may be used. More specifically, the users for which playback information is to be presented may be divided into multiple groups based on their playback positions. For each group, a corresponding expandable group indicator may be presented on the scrubber bar 14 as a position corresponding to a general playback position for the group. The general playback position for a group may be an average of the playback positions of the users in the group, a medium playback position for the users in the group, or the like. The associated user may then click on or otherwise select a desired expandable group indicator. In response, a list of users in the group, the playback positions of the users in the group, or both may be presented to the associated user.

Figure 4:
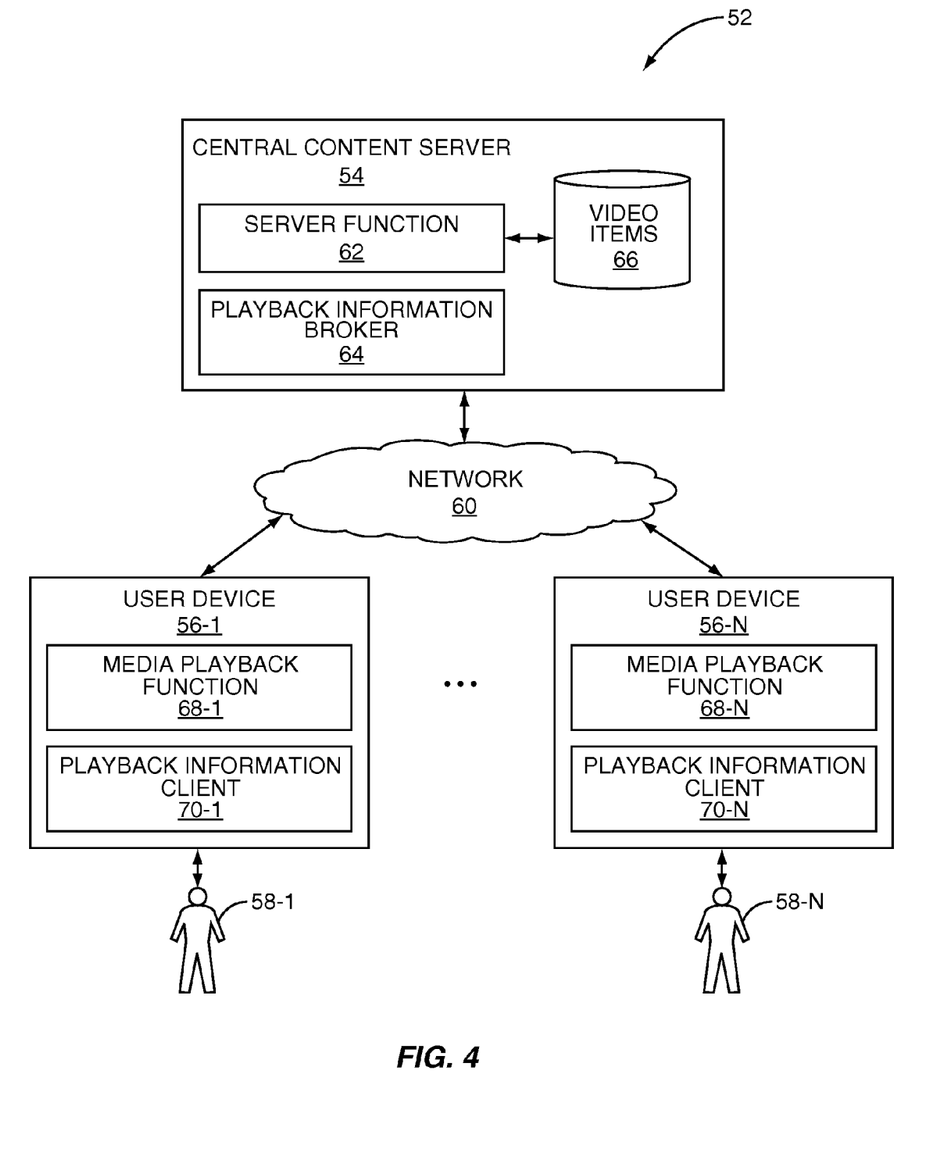
FIG. 4 illustrates a system enabling presentation of information to a user playing a media item identifying playback positions of a number of other users also playing the media item according to one embodiment of the present invention.

FIG. 4 illustrates a system 52 for presenting, to a user playing a video item, information identifying playback positions of other users playing the video item according to a first embodiment of the present invention. In general, the system 52 includes a central content server 54 and a number of user devices 56-1 through 56-N having associated users 58-1 through 58-N. The central content server 54 and the user devices 56-1 through 56-N are connected via a network 60. The network 60 may be any type of Wide Area Network (WAN) or Local Area Network (LAN), or any combination thereof, and may include wired components, wireless components, or both wired and wireless components. In one embodiment, the network 60 is the Internet.

The central content server 54 may be, for example, an Internet server operating to stream or download video items to the user devices 56-1 through 56-N. As another example, the central content server 54 may be a server, such as a head-end, in a Cable Television (CATV) network providing a Video On Demand (VOD) service or the like. The central content server 54 includes a server function 62 and a playback information broker 64, each of which may be implemented in software, hardware, or a combination thereof. In an alternative embodiment, the playback information broker 64 may be hosted by a separate server such as, for example, a server operated by a third party. As another alternative, the playback information broker 64 may be hosted by a mediating server which can be any node between the central content server 54 and the user devices 56-1 through 56-N. The server function 62 generally operates to provide streaming or downloading of video items 66 to the user devices 56-1 through 56-N. The playback information broker 64 generally operates to maintain, for each video item 66, playback information identifying users from the users 58-1 through 58-N that are playing the video item 66 at that time as well as the playback positions of those users. In addition, as discussed below, when, for example, a video item 66 is played at the user device 56-1, the playback information broker 64 provides information identifying the playback positions of other users from the users 58-2 through 58-N that are playing the video item 66 at that time.

Each of the user devices 56-1 through 56-N may be, for example, a personal computer, a portable media player having video playback and network capabilities, a mobile smart phone having video playback capabilities, a set-top box, a gaming console having video playback capabilities, or the like. The user device 56-1 includes a media playback function 68-1 and a playback information client 70-1, each of which may be implemented in software, hardware, or a combination thereof. Further, while the media playback function 68-1 and the playback information client 70-1 are illustrated separately, the media playback function 68-1 and the playback information client 70-1 may be implemented in a single software and/or hardware application or implemented separately. For example, in one embodiment, the media playback function 68-1 and the playback information client 70-1 may be implemented in a single media player software application. As another example, the media playback function 68-1 may be implemented as, or as part of, a media player software application, and the playback information client 70-1 may be implemented as a plug-in to that software application. As a final example, in an embodiment where the central content server 54 streams the video items 66 to the user devices 56-1 through 56-N, the media playback function 68-1 and the playback information client 70-1 may be implemented within a web browser, as plug-ins to a web browser, or the like.

The media playback function 68-1 generally operates to provide playback of video items obtained from the central content server 54. As discussed above, the video items may be downloaded from the central content server 54 to the user device 56-1 or streamed from the central content server 54 to the user device 56-1. Note that video items 66 downloaded from the central content server 54 may be stored at the user device 56-1 and subsequently accessed for playback. When one of the video items 66 obtained from the central content server 54 is selected for playback, the playback information client 70-1 generally operates to obtain playback information from the playback information broker 64 of the central content server 54. The playback information includes information identifying playback positions of one or more users from the users 58-2 through 58-N that are playing the video item 66 at that time and, optionally, identifying the one or more users from the users 58-2 through 58-N that are playing the video item 66. During playback of the video item 66 at the user device 56-1, the playback information client 70-1 then presents, or causes to be presented, the information identifying the playback positions of the other users from the users 58-2 through 58-N that are also playing the video item 66.

Likewise, the user devices 56-2 through 56-N include media playback functions 68-2 through 68-N and playback information clients 70-2 through 70-N, respectively. The operation of the media playback functions 68-2 through 68-N and the playback information clients 70-2 through 70-N are the same as that discussed above with respect to the media play back function 68-1 and the playback information client 70-1, respectively. As such, the details are not repeated.

Figure 5:
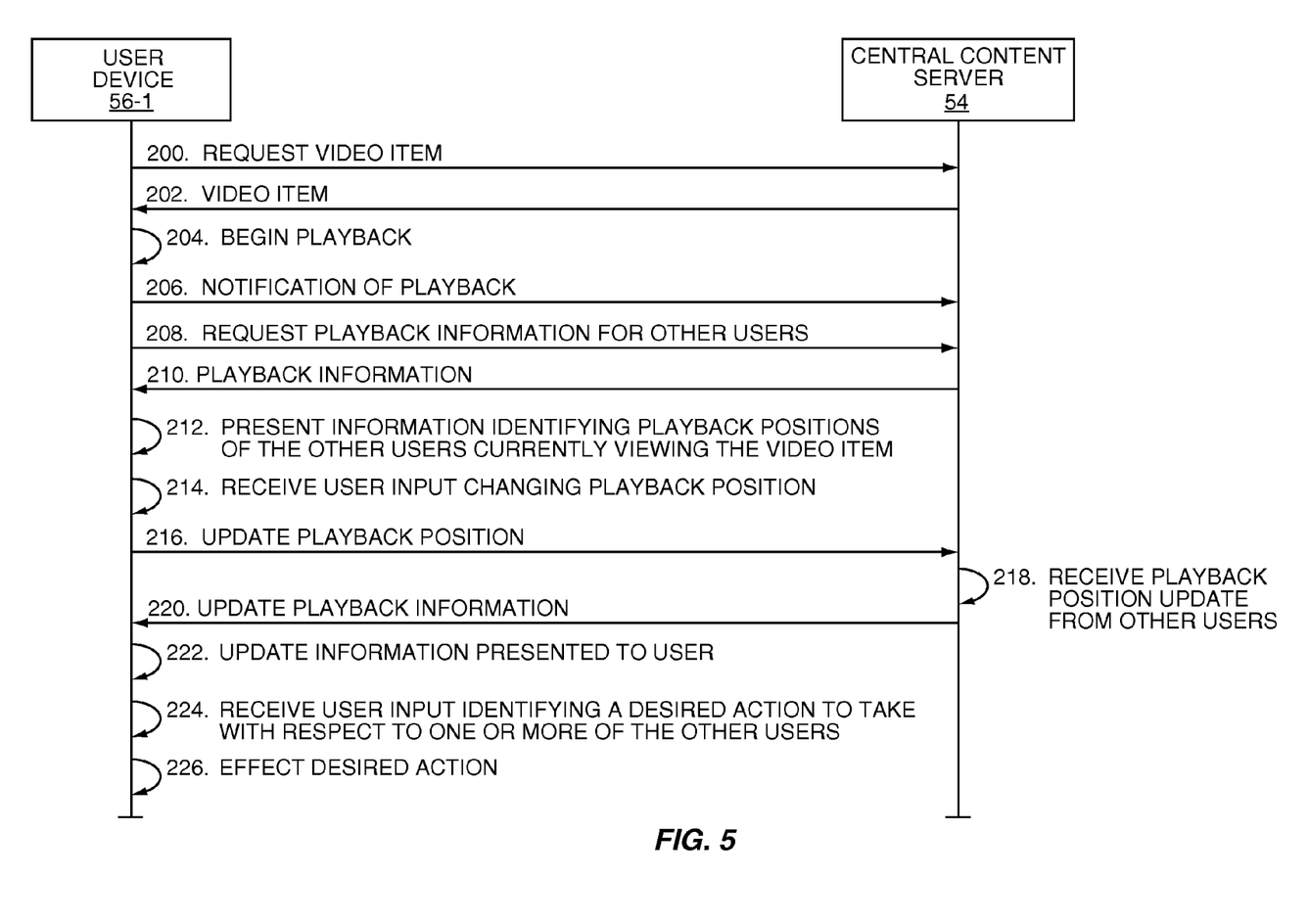
FIG. 5 illustrates the operation of the system of FIG. 4 according to one embodiment of the present invention.

FIG. 5 illustrates the operation of the system 52 of FIG. 4 according to one embodiment of the present invention. First, in this example, the user device 56-1 requests a video item 66 from the central content server 54 (step 200). Next, the video item 66 is returned from the central content server 54 to the user device 56-1 (step 202). The video 66 may be streamed to the user device 56-1 or downloaded to the user device 56-1. Then, playback of the video item 66 by the media playback function 68-1 begins (step 204). In the case of streaming the video item 66 to the user device 56-1, playback may begin automatically after a desired amount of the video item 66 has been buffered. In the case of downloading the video item 66, playback may begin upon initiation of playback by the user 58-1. In this embodiment, user device 56-1, and more specifically the playback information client 70-1, notifies the playback information broker 64 of the start of playback of the video item 66 and, optionally, a starting playback position (step 206). However, there may be embodiments where the video item 66 is streamed to the user device 56-1 in such a manner that notification of the start of playback is not needed.

In this embodiment, the playback information client 70-1, either automatically or upon receiving a request from the user 58-1, sends a request to the playback information broker 64 of the central content server 54 for playback information for other users from the users 58-2 through 58-N that are also playing the video item 66 at that time (step 208). In response, the playback information broker 64 of the central content server 54 identifies other users from the users 58-2 through 58-N that are also playing the video item 66 and sends playback information for those other users to the user device 56-1 (step 210). Alternatively, the playback information broker 64 may automatically push the playback information to the user device 56-1. For example, the playback information broker 64 may automatically push the playback information to the user device 56-1 in response to receiving notification of the start of playback of the video item or, if the video item 66 is streamed to the user device 56-1, upon receiving a request for the stream of the video item 66 from the user device 56-1.

Again, the playback information includes information identifying the playback positions of the other users playing the video item 66. For each of the other users, the information identifying the playback position of that user may be, for example, an amount of time from the beginning of the video item 66 defining the playback position of the user. Alternatively, the playback information may be a general location such as information identifying a segment of the video item being viewed (e.g., chapter) or the like. In addition, the playback information may include information identifying each of the other users playing the video item such as, for example, names, usernames, pictures, or the like.

In one embodiment, the playback information provided to the user device 56-1 includes playback information for all other users playing the video item 66 at that time. In another embodiment, the playback information provided to the user device 56-1 includes a subset of all of the other users playing the video item 66 at that time. More specifically, as discussed above, the playback information broker 64 may provide the playback information for a subset of all of the other users playing the video item 66 identified based on one or more criteria such as, for example, geographic location, geographic distance from the user 58-1, demographic information (e.g., age, sex, or the like), a social network of the user 58-1, similarity of user profiles and/or preferences of the other users to a user profile and/or user preferences of the user 58-1, or the like. The criteria to be used for filtering may be pre- defined by the playback information broker 64, predefined by the user 58-1, or defined by the user 58-1 at the time of making the request. If defined by the user 58-1, the criteria may be provided, for example, within the request.

For example, the playback information broker 64 may first identify a list of other users from the users 58-2 through 58-N currently playing the video item 66 and filter the list based on geographic location to remove users that are not located within the same geographic location as the user 58-1. The geographic location may be any geographic region such as, but not limited to, a country, a region of a country, a state, a city, a town, an area defined by a telephone area code, an area defined by a zip code, an area defined by geographic designations such as latitude and longitude, or the like. The geographic locations of the users 58-1 through 58-N may be determined using any known location-determination scheme. For instance, the location of the users 58-1 through 58-N may be determined using Global Positioning System (GPS) receivers within or otherwise associated with the user devices 56-1 through 56-N; determined based on Internet Protocol (IP) addresses of the user devices 56-1 through 56-N; obtained by the playback information broker 64 from information provided by the users 58-1 through 58-N such as, for example, mailing addresses or phone numbers; or the like. As another example, the list of other users from the users 58-2 through 58-N currently playing the video item 66 may be filtered to remove users that are not within a defined geographic, or physical, distance from the user 58-1.

As another example, the list of other users from the users 58-2 through 58-N currently playing the video item 66 may be filtered to remove users that do not have demographics matching those of the user 58-1, demographics identified by the user 58-1 as preferred demographics, demographics within a defined range of the demographics of the user 58-1, or the like. For example, if the user 58-1 has indicated he is 29 years old, the playback information broker 64 may remove users from the list whose ages are not within a defined age range such as, for example, 25-35 years old. As another example, the user 58-1 may indicate that he wishes to see the playback positions of other users that are within the age range of 25-35 years old, female, and not married. As such, the playback information broker 64 may filter the list of other users playing the video item 66 based on these criteria in order to provide the filtered list of users for which to provide playback information to the user device 56-1.

As a final example, the list of all other users from the users 58-2 through 58-N currently playing the video item 66 may be filtered to remove users that are not within a social network of the user 58-1, within a defined logical distance from the user 58-1 in a social network of the user 58-1, on a contact list such as an email contact list or buddy list of the user 58-1, or the like. In one embodiment, information defining the social network of the user 58-1 may be hosted by the central content server 54 or obtained from a social networking service such as, for example, a social networking website such as MySpace®, LinkedIN®, or the like. For example, each of the users 58-1 through 58-N may be required to register with the central content server 54 and provide a username or other user ID used in a social network hosted by a social networking service. The playback information broker 64 may then query the social networking service using the username or other user ID of the user 58-1 to obtain the usernames or other user IDs defining the social network of the user 58-1. The playback information broker 64 may then correlate the usernames or user IDs of the users in the social network of the user 58-1 to those provided by the other users from the users 58-2 through 58-N that are playing the video item 66 during registration to identify other users that are playing the video item 66 and are also in the social network of the user 58-1. Similarly, the playback information broker 64 may identify those other users that are playing the video item 66 and are also within a desired degree of separation from the user 58-1 in the social network of the user 58-1. In a similar manner, a contact list of the user 58-1 may be hosted by the central content server 54, obtained from the user device 56-1, or obtained from a remote source such as, for example, a web-based email service and used to filter the list of other users currently viewing the video item 66.

Upon receiving the playback information for the other users from the users 58-2 through 58-N that are currently playing the video item 66, the playback information client 70-1 of the user device 56-1 presents, to the user 58-1, the playback information including the information identifying the playback positions of the other users currently viewing the video item (step 212). In one embodiment, the playback information received from the playback information broker 64 of the central content server 54 includes playback information for all of the other users from the users 58-2 through 58-N that are currently viewing the video item 66. In another embodiment, the playback information received from the playback information broker 64 of the central content server 54 includes playback information of a subset of all of the other users from the users 58-2 through 58-N that are currently viewing the video item.

The playback information client 70-1 may present the playback information received from the playback information broker 64 to the user 58-1. Alternatively, in a manner similar to that discussed above with respect to the playback information broker 64, the playback information client 70-1 may filter the playback information received from the playback information broker 64 based on one or more criteria such as, for example, geographic location, geographic distance from the user 58-1, demographic information (e.g., age, sex, or the like), a social network of the user 58-1, or the like. Note that the information needed for such filtering may be provided in association with the playback information from the playback information broker 64. For example, the geographic locations of the other users, the demographic information for the other users, usernames or other user IDs used in a social network, or the like may be obtained by the playback information broker 64 in the manner discussed above and provided to the playback information client 70-1 as needed.

Again, the manner in which the playback information is presented to the user 58-1 may vary. For example, the playback information may be presented as user indictors on a scrubber bar in a manner similar to that shown in FIG. 2. As another example, the playback information may be presented as a list of playback positions for the other users playing the video item 66 or a list having expandable/collapsible playback time ranges similar to that shown in FIG. 3. As another example, as discussed above, the playback information may be presented in a collapsible form using expandable group indicators on a scrubber bar in a manner similar to that shown in FIG. 2. As discussed above, the playback information presented to the user 58-1 may be automatically updated in a manner that assumes continued playback of the video item 66 by the other users. The playback information may be further updated based on updates received from the playback information broker 64 in response to playback control events during playback of the video item 66 by the other users.

In this example, the user device 56-1, and more specifically the media playback function 68-1, receives user input from the user 58-1 changing the playback position of the user 58-1 (step 214). For example, the user 58-1 may instruct the media playback function 68-1 to fast-forward, rewind, or the like. In response, playback is controlled, and the playback information client 70-1 sends an update to the playback position of the user 58-1 to the playback information broker 64 of the central content server 54 (step 216). Using the starting playback position of the user 58-1, the updates to the playback position of the user 58-1 in response to playback control events, and an internal clock or timer, the playback information broker 64 is enabled to maintain the current playback position of the user 58-1. In a similar manner, the playback information client 70-1 is enabled to maintain, or update, the playback positions of the other users. In an alternative embodiment, the user device 58-1 may send periodic updates to the playback information broker 64 for the playback position of the user 58-1 such that the playback information broker 64 is enabled to maintain the current playback position of the user 58-1.

In this example, at some point in time, the playback information broker 64 of the central content server 54 receives a playback position update from one of the other users currently playing the video item 66 (step 218). In response, the playback information broker 64 of the central content server 54 sends an update to the playback information to the user device 56-1 (step 220), and the playback information client 70-1 updates the information presented to the user 58-1 at the user device 56-1 (step 222).

Also in this example, at some point in time, the playback information client 70-1 receives user input from the user 58-1 identifying a desired action to take with respect to one or more of the other users currently playing the video item 66 (step 224). In response, the playback information client 70-1 effects, or causes, the desired action (step 226). For example, as discussed above, the user 58-1 may select one of the other users and choose to "follow" the selected user in playback of the video item 66. The playback information client 70-1 may then control the media playback function 68-1 based on the playback information, and any updates thereto, provided to the user device 56-1 for the selected user such that playback of the video item 66 to the user 58-1 is substantially synchronized to playback of the video item 66 to the selected user.

As another example, as discussed above, the user 58-1 may select one or more of the other users and choose to have them "follow" him in playback of the video item 66. In response, in an exemplary embodiment, the playback information client 70-1 may notify the central content server 54. The central content server 54 may then request approval from the selected users. If the selected users approve, then playback of the video item 66 by the corresponding user devices of the selected users is controlled based on playback information provided to those user devices such that playback of the video item 66 at those user devices is substantially synchronized with playback at the user device 56-1. Alternatively, the central content server 54 may force the other users to follow the user 58-1 in playback of the video item 66 without their approval.

As a final example, the user 58-1 may select one or more of the other users and choose to initiate a chat session with those users. The chat session may be initiated by a third party chat application. Any information needed to initiate the chat session, such as usernames or user IDs, may be provided to the central content server 54 during registration and obtained from the central content server 54 as needed. Alternatively, such information may be provided within or in association with the playback information.

It should be noted that while the discussion above focuses on the playback of video items streamed or downloaded from the central content server 54, the present invention is not limited thereto. In addition or alternatively, the present invention may be utilized with respect to playback of video items obtained from local sources such as, for example, Digital Video Disc (DVD) players incorporated into or connected to the user devices 56-1 through 56-N. Thus, for example, the user device 56-1 may be providing playback of a video item from an associated DVD player, the user device 56-2 may be providing playback of a previously downloaded copy of the video item obtained from the central content server 54 or some other content source, and the user device 56-3 may be providing playback of a stream of the video item from the central content server 54. Then, with respect to the user 58-1, playback information for the other two users 58-2 and 58-3 also playing the video item is obtained from the playback information broker 64 and presented to the user 58-1. Likewise, with respect to the user 58-2, playback information for the other two users 58-1 and 58-3 playing the video item is obtained from the playback information broker 64 and presented to the user 58-2. Finally, with respect to the user 58-3, playback information for the other two users 58-1 and 58-2 playing the video item is obtained from the playback information broker 64 and presented to the user 58-3.

Figure 6:
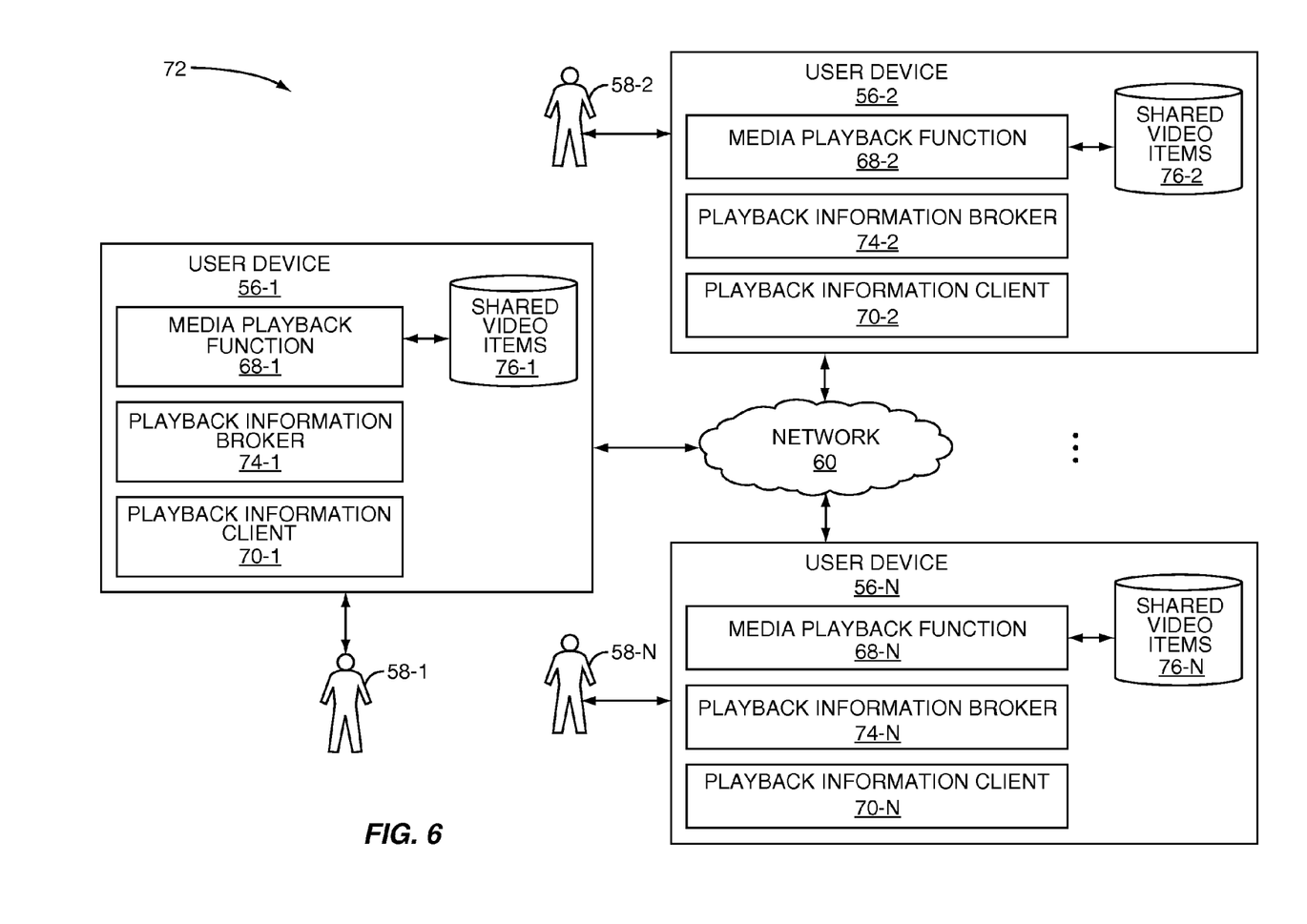
FIG. 6 illustrates a system enabling presentation of information to a user playing a media item identifying playback positions of a number of other users also playing the media item according to another embodiment of the present invention.

FIG. 6 illustrates a system 72 for presenting information, to a user playing a video item, identifying playback positions of other users playing the video item according to another embodiment of the present invention. In general, the system 72 includes the user devices 56-1 through 56-N having associated users 58-1 through 58-N. However, in this embodiment, the user devices 56-1 through 56-N are connected via a peer-to-peer (P2P) overlay network formed on top of the network 60.

More specifically, the user device 56-1 includes the media playback function 68-1, the playback information client 70-1, and a playback information broker 74-1. Likewise, the user devices 56-2 through 56-N include the media player functions 68-2 through 68-N, the playback information clients 70-1 through 70-N and playback information brokers 74-2 through 74-N, respectively. In this embodiment, the media playback function 68-1 operates to obtain video items from the other user devices 56-2 through 56-N. Again, the video items may be streamed or downloaded. In addition, the media playback function 68-1 of this embodiment performs a server function in order to share one or more shared video items 76-1 hosted by the user device 56-1 with the other user devices 56-2 through 56-N. The playback information client 70-1 generally operates to obtain playback information for other users that are also playing a video item being played by the user 58-1 from one or more of the playback information brokers 74-2 through 74-N of the other user devices 56-2 through 56-N.

The playback information broker 74-1 may be implemented in software, hardware, or a combination thereof. In one embodiment, the playback information broker 74-1 operates as the playback information broker for a number of shared video items 76-1 originating from or shared by the user device 56-1. More specifically, the playback information broker 74-1 operates as the playback information broker for other user devices from the user devices 56-2 through 56-N with which the user device 56-1 has shared the video items 76-1 and, optionally, user devices with which those other user devices have shared the video items 76-1. In an alternative embodiment, the playback information brokers 74-1 through 74-N operate in a collaborative manner to maintain and provide playback information in a manner similar to that discussed above. The playback information may be maintained in a structured overlay on the P2P network such as a distributed hash table. For example, each of the playback information brokers 74-1 through 74-N may maintain playback information for the corresponding user locally or in a structured overlay on the P2P network such as a distributed hash table. Then, as an example, when the user 58-1 is playing a video item, the playback information client 70-1 may query the playback information brokers 74-2 through 74-N via the P2P overlay network, or alternatively a distributed hash table, for playback information for other users from the users 58-2 through 58-N that are also playing the video item. In response, playback information for other users also playing the video item is returned to the playback information client 70-1, which then presents the playback information to the user 58-1 as discussed above. Note that filtering may be used to reduce the number of other users for which playback information is presented to the user 58-1. As discussed above, the filtering may occur at the source of the playback information, which in this example is the playback information brokers 74-2 through 74-N, or at the user device 56-1.

Thus, in operation, the user 58-1 begins playback of a video item. The video item may be streamed or downloaded from one or more of the user devices 58-2 through 58-N sharing the video item. For this example, assume that the video item is shared by the user device 56-N. The playback information client 70-1 then obtains playback information including playback positions of one or more other users from the users 58-2 through 58-N that are also playing the video item. The playback information may be requested or pushed from the playback information broker 74-N of the user device 56-N sharing the video item. Alternatively, the playback information client 70-1 may query the playback information brokers 74-2 through 74-N of the user devices 56-2 through 56-N of the other users 58-2 through 58-N for playback information for other users also playing the video item. As yet another alternative, the playback information client 70-1 may query a distributed hash table or similar overlay structure storing playback information for the users 58-1 through 58-N for playback information for other users also playing the video item. In response, the playback information client 70-1 receives playback information for other users also playing the video item and then presents the playback information to the user 58-1. Thereafter, depending on the particular embodiment, updates to the playback information may be obtained from the playback information broker 74-N of the user device 56-N from which the video item was obtained or playback information brokers 74-2 through 74-N of the other users that are also playing the video item.

Note that while the discussion of FIG. 6 above focuses on an embodiment where the video items are hosted by the user devices 56-1 through 56-N connected to the P2P overlay network, the present invention is not limited thereto. The video items may alternatively be obtained from a centralized source such as a streaming video server. The playback information brokers 74-1 through 74-N may then maintain playback information for the corresponding users 58-1 through 58-N locally or in a structured overlay such as a distributed hash table.

Figure 7:
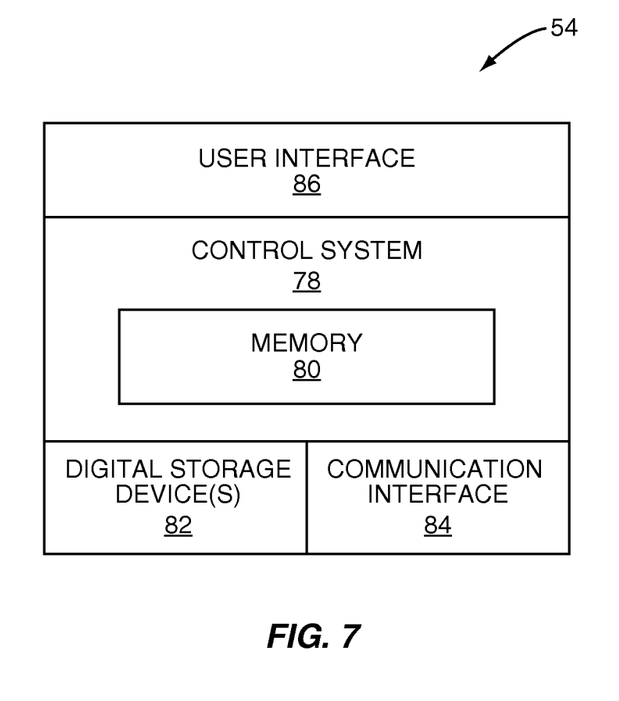
FIG. 7 is a block diagram of the central content server of FIG. 4 according to one embodiment of the present invention.

FIG. 7 is a block diagram of the central content server 54 of FIG. 4 according to one embodiment of the present invention. In general, the central content server 54 includes a control system 78 having associated memory 80. In one embodiment, the server function 62 and the playback information broker 64 (FIG. 4) are implemented in software and stored in the memory 80. However, the present invention is not limited thereto. Each of the server function 62 and the playback information broker 64 may be implemented in software, hardware, or a combination thereof. Further, as discussed above, in another embodiment, the playback information broker 64 may alternatively be hosted by a separate server such as, for example, a server operated by a third party. The central content server 54 may also include one or more digital storage devices 82 such as, for example, one or more hard-disk drives or the like. The central content server 54 also includes a communication interface 84 communicatively coupling the central content server 54 to the network 60 (FIG. 4). Lastly, the central content server 54 may include a user interface 86, which may include components such as, for example, a display, one or more user input devices, or the like.

Figure 8:
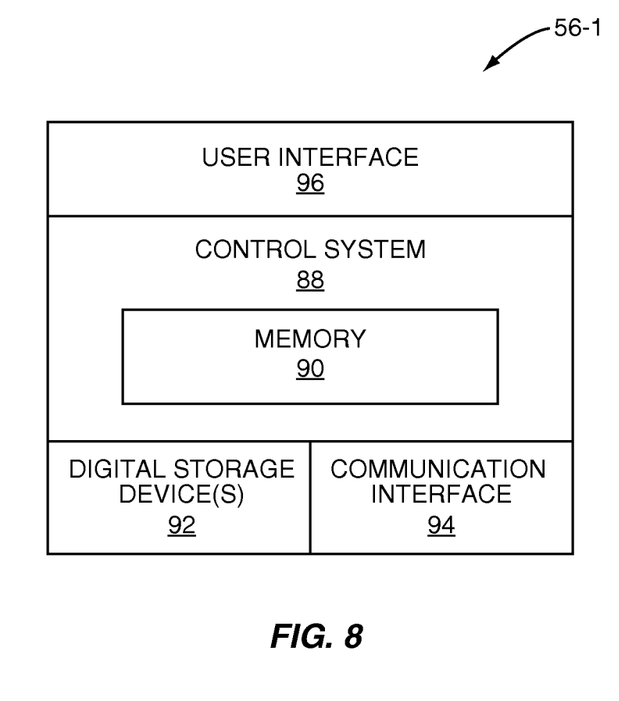
FIG. 8 is a block diagram of one of the user devices of FIGS. 4 and 6 according to one embodiment of the present invention.

FIG. 8 is a block diagram of the user device 56-1 of FIGS. 4 and 6 according to one embodiment of the present invention. This discussion is equally applicable to the other user devices 56-2 through 56-N. In general, the user device 56-1 includes a control system 88 having associated memory 90. In one embodiment, the media playback function 68-1 and the playback information client 70-1 (FIGS. 4 and 6) are implemented in software and stored in the memory 90. However, the present invention is not limited thereto. The media playback function 68-1 and the playback information client 70-1 may each be implemented in software, hardware, or a combination thereof. In addition, in the embodiment of FIG. 6, the playback information broker 74-1 may also be implemented in software and stored in the memory 90. Again, the present invention is not limited thereto. The playback information broker 74-1 may be implemented in software, hardware, or a combination thereof. The user device 56-1 may also include one or more digital storage devices 92 such as, for example, one or more hard-disk drives or the like. The user device 56-1 also includes a communication interface 94 communicatively coupling the user device 56-1 to the network 60 (FIGS. 4 and 6). Lastly, the user device 56-1 includes a user interface 96, which may include components such as a display, one or more speakers, one or more user input devices, and the like.

The present invention provides substantial opportunity for variation without departing from the spirit or scope of the present invention. For example, while the discussion above focuses on presenting the playback information to a user via an associated user device used for playback of the video item, the present invention is not limited thereto. For example, if the user 58-1 is playing a video item on the user device 56-1, playback information identifying playback positions of one or more other users from the users 58-2 through 58-N that are also playing the video item may be presented to the user 58-1 via a secondary device of the user 58-1. For instance, the user 58-1 may be playing the video item on a personal computer or set-top box and have the playback information presented to him on a secondary device such as a mobile smart phone. The playback information may be provided directly to the secondary device from the playback information broker 64, or alternatively one or more of the playback information brokers 74-2 through 74-N. This may be enabled by including the necessary contact information in the request for the playback information, predefined configurations of the user 58-1, or the like. Alternatively, the playback information may be relayed from the user device 56-1 to the secondary device using, for example, a local wireless communication interface such as, for example, a Bluetooth or IEEE 802.11x wireless interface.

As a second example, while the discussion herein focuses on obtaining and presenting playback information for other users playing the same video item, the present invention is not limited thereto. More specifically, the present invention may additionally or alternatively present playback information for a number of other users that are playing a video item to a user that is not playing that video item. For instance, the user 58-1 may select a video item but not initiate playback of the video item and be presented with playback information for other users from the users 58-2 through 58-N that are playing the video item at that time. Further, the present invention may additionally or alternatively present, to a first user playing a first video item, playback information for one or more other users from the users 58-2 through 58-N that are playing one or more other video item.

Those skilled in the art will recognize improvements and modifications to the preferred embodiments of the present invention. All such improvements and modifications are considered within the scope of the concepts disclosed herein and the claims that follow.

What is claimed is:

1. A method of operation of a user device of a user, comprising:
   obtaining information identifying playback positions of one or more other users playing a media item; and
   presenting the information identifying the playback positions of the one or more other users to the user wherein, for each of the one or more other users, presenting the information comprises presenting an indicator on a scrubber bar at a location corresponding to the playback position of the other user, wherein:
   for each of the one or more other users, dynamically obtaining information identifying the playback position of the other user while the other user is playing the media item; and
   for each of the one or more other users, dynamically updating the location of the indicator on the scrubber bar so that the location of the indicator corresponds to the playback position while the other user is playing the media item.

2. The method of claim 1 wherein presenting the information identifying the playback positions of the one or more other users comprises presenting the information identifying the playback positions of the one or more other users during playback of the media item at the user device.

3. The method of claim 1 further comprising:
   initiating playback of the media item at the user device;
   wherein obtaining the information identifying the playback positions of the one or more other users and presenting the information identifying the playback positions of the one or more other users are performed in response to initiating playback of the media item at the user device.

4. The method of claim 1 wherein obtaining the information identifying the playback positions of the one or more other users playing the media item comprises receiving, from a playback information broker, playback information comprising the information identifying the playback positions of the one or more other users playing the media item, the playback information broker operating to maintain playback information for a plurality of users including the one or more other users wherein the playback information for each one of the plurality of users comprises information identifying a media item being played by the one of the plurality of users and information identifying a playback position for the media item being played by the one of the plurality of users.

5. The method of claim 4 wherein the playback information received from the playback information broker is playback information for all users from the plurality of users that are playing the media item at a time of a request.

6. The method of claim 4 wherein the playback information received from the playback information broker is playback information for a subset of all users from the plurality of users that are playing the media item at a time of a request identified by the playback information based on one or more criteria.

7. The method of claim 6 wherein the one or more criteria comprises one or more of a group consisting of: geographic location, geographic distance from the user, a contact list of the user, a social network of the user, demographic information, similarity of user profiles, and similarity of user preferences.

8. The method of claim 4 wherein obtaining the information identifying the playback positions of the one or more other users playing the media item further comprises sending a request to the playback information broker for playback information for other users playing the media item;
wherein receiving the playback information for the one or more other users playing the media item comprises receiving, from the playback information broker, the playback information for the one or more other users playing the media item from the playback information broker in response to the request.

9. The method of claim 4 further comprising:
sending a request for the media item from a remote content source; and
receiving a stream of the media item from the remote content source in response to the request;
wherein receiving the playback information for the one or more other users playing the media item comprises receiving, from the playback information broker, the playback information for the one or more other users playing the media item from the playback information broker automatically in response to sending the request and receiving the stream of the media item.

10. The method of claim 1 further comprising:
obtaining the media item from a second user device of a plurality of user devices in communication with the user device via a peer-to-peer overlay network;
wherein obtaining the information identifying the playback positions of one or more other users playing the media item comprises obtaining the information identifying the playback positions of the one or more other users playing the media item from the second user device.

11. The method of claim 1 wherein the user device is communicatively coupled to a plurality of other user devices each associated with one of a plurality of other users including the one or more other users to form a peer-to-peer network, and further comprising:
obtaining the media item from a second user device of the plurality of other user devices;
wherein obtaining the information identifying the playback positions of the one or more other users playing the media item comprises:
sending a query to the plurality of other user devices in the peer-to-peer network; and
in response to the query, receiving the information identifying the playback positions of the one or more other users of the plurality of other users that are playing the media item.

12. The method of claim 1 wherein the one or more other users is a plurality of other users and presenting the information identifying the playback positions of the plurality of other users comprises:
forming a plurality of user groups each including one or more of the plurality of other users based on the playback positions of the plurality of other users; and
for each user group, presenting an expandable group indicator representative of a general playback position of the one or more of the plurality of other users in the user group.

13. The method of claim 1 further comprising updating the information identifying the playback positions for each of the one or more other users as playback continues of the media item for each of the one or more other users.

14. The method of claim 1 further comprising:
receiving updates for the information identifying the playback positions of the one or more other users playing the media item; and
updating the information identifying the playback positions of the one or more other users presented to the user in response to the updates.

15. The method of claim 1 further comprising:
receiving updates for the information identifying the playback positions of the one or more other users playing the media item in response to playback control events that occur during playback of the media item by the one or more other users; and
updating the information identifying the playback positions of the one or more other users presented to the user in response to the updates.

16. The method of claim 1 further comprising:
receiving an update for the information identifying the playback positions of the one or more other users playing the media item including information identifying a playback position of an additional user beginning playback of the media item; and
updating the information identifying the playback positions of the one or more other users presented to the user to further present the information identifying the playback position of the additional user.

17. The method of claim 1 wherein presenting the information identifying the playback positions of the one or more other users to the user comprises presenting the information identifying the playback positions of the one or more other users to the user via a user interface of the user device.

18. The method of claim 1 wherein presenting the information identifying the playback positions of the one or more other users to the user comprises causing presentation of the information identifying the playback positions of the one or more other users to the user via an associated device.

19. The method of claim 1 further comprising:
receiving, from the user, user input identifying a desired action to take with respect to one or more select users from the one or more other users for which the information is presented; and
causing the desired action.

20. A user device of a user, comprising:
a communication interface communicatively coupling the user device to at least one playback information broker via a network; and
a control system associated with the communication interface and adapted to:
obtain, from the at least one playback information broker, information identifying playback positions of one or more other users playing a media item; and
present, to the user of the user device, the information identifying the playback positions of the one or more other users on a scrubber bar wherein, for each other user of the one or more other users, the scrubber bar includes an indicator that identifies the other user and identifies the playback positions of the other user, wherein the control system is further adapted to:
for each of the one or more other users, dynamically obtain information identifying the playback position of the other user while the other user is playing the media item; and
for each of the one or more other users, dynamically update the location of the indicator on the scrubber bar so that the location of the indicator corresponds to the playback position while the other user is playing the media item.

21. A non-transitory computer readable medium comprising software for instructing a computing device of a user to:
   obtain information identifying playback positions of one or more other users playing a media item; and
   present, to the user of the computing device, the information identifying the playback positions of the one or more other users on a scrubber bar wherein, for each other user of the one or more other users, the scrubber bar includes an indicator that identifies the other user and identifies the playback positions of the other user, wherein the software further instructs the computing device to:
   for each of the one or more other users, dynamically obtaining information identifying the playback position of the other user while the other user is playing the media item; and
   for each of the one or more other users, dynamically updating the location of the indicator on the scrubber bar so that the location of the indicator corresponds to the playback position while the other user is playing the media item.

22. The method of claim 1 wherein, for each of the one or more other users, dynamically updating the location of the indicator on the scrubber bar so that the location of the indicator corresponds to the playback position while the other user is playing the media item occurs during playback of the media item at the user device.

23. The method of claim 1 wherein, for each of the one or more other users, dynamically obtaining the information identifying the playback positions of the other users while the other user is playing the media item comprises dynamically receiving the playback information from a playback information broker, the playback information broker operating to dynamically maintain the playback information for the other user wherein the playback information identifies the media item being played by the other user and the playback position for the media item being played by the other user.

24. The method of claim 1 further comprising, for each of the one or more other users, dynamically obtaining the information identifying the playback positions of the other users while the other user is playing the media item comprises is in response to playback control events that occur during playback of the media item by the other user.

25. The user device of claim 20 wherein the control system is further adapted to, for each of the one or more other users, dynamically updating the location of the indicator on the scrubber bar so that the location of the indicator corresponds to the playback position while the other user is playing the media item occurs during playback of the media item at the user device.

26. The user device of claim 20 wherein the control system is further adapted to, for each of the one or more other users, dynamically obtaining the information identifying the playback positions of the other users while the other user is playing the media item comprises dynamically receiving the playback information from a playback information broker, the playback information broker operating to dynamically maintain the playback information for the other user wherein the playback information identifies the media item being played by the other user and the playback position for the media item being played by the other user.

27. The user device of claim 20 wherein the control system is further adapted to, for each of the one or more other users, dynamically obtaining the information identifying the playback positions of the other users while the other user is playing the media item comprises is in response to playback control events that occur during playback of the media item by the other user.

28. The non-transitory computer readable medium of claim 21 wherein the software further instructs the computing device to, for each of the one or more other users, dynamically updating the location of the indicator on the scrubber bar so that the location of the indicator corresponds to the playback position while the other user is playing the media item occurs during playback of the media item at the user device.

29. The non-transitory computer readable medium of claim 21 wherein the software further instructs the computing device to, for each of the one or more other users, dynamically obtaining the information identifying the playback positions of the other users while the other user is playing the media item comprises dynamically receiving the playback information from a playback information broker, the playback information broker operating to dynamically maintain the playback information for the other user wherein the playback information identifies the media item being played by the other user and the playback position for the media item being played by the other user.

30. The non-transitory computer readable medium of claim 21 wherein the software further instructs the computing device to, for each of the one or more other users, dynamically obtaining the information identifying the playback positions of the other users while the other user is playing the media item comprises is in response to playback control events that occur during playback of the media item by the other user.

* * * * *